United States Patent [19]

Taluba et al.

[11] 4,277,232
[45] Jul. 7, 1981

[54] APPARATUS FOR FORMING A MOLDED SQUEEZE TOY INCLUDING WHISTLE

[76] Inventors: Anthony P. Taluba, Lebanon, N.J.; Paul A. Taluba, Morrisville, N.Y.

[21] Appl. No.: 923,446

[22] Filed: Jul. 10, 1978

Related U.S. Application Data

[62] Division of Ser. No. 727,473, Sep. 28, 1976, abandoned.

[51] Int. Cl.³ .................................... B29C 17/07
[52] U.S. Cl. .................................... 425/525; 425/535
[58] Field of Search ............ 46/117, 118, 174, 175 R, 46/177–179; 264/512, 513, 515, 516, 524, 540, 542, 543; 156/293, 294; 29/453, 805; 425/525, 535, 536

[56] References Cited

U.S. PATENT DOCUMENTS

| 2,730,765 | 1/1956 | Crafton et al. ............... 29/453 UX |
| 3,314,106 | 4/1967 | Latreille et al. .................. 425/525 |
| 3,502,758 | 3/1970 | Plummer ........................ 264/535 X |
| 3,531,556 | 9/1970 | Mehnert ......................... 425/525 X |
| 3,705,931 | 12/1972 | Confer et al. ................. 425/525 X |
| 3,742,995 | 7/1973 | Confer et al. ................. 264/310 X |

FOREIGN PATENT DOCUMENTS

| 337240 | 5/1921 | Fed. Rep. of Germany ............ 46/117 |
| 1031489 | 6/1953 | France ..................................... 46/117 |
| 1386210 | 12/1964 | France ..................................... 425/525 |

*Primary Examiner*—Jan H. Silbaugh
*Attorney, Agent, or Firm*—Martha G. Pugh

[57] ABSTRACT

A squeeze toy of air-filled elastomer material including a whistle, and a method and apparatus for forming the same. A small cavity or depression is molded into the body of the toy to form the whistle site. A small cap, which may comprise a flat or slightly rounded disk, or a small hollow cylinder, closes the small cavity or depression forming the whistle site. A pair of small openings are formed in centered, aligned relation in the cap and in the bottom of the cavity, completing the whistle. The body of the toy is preferably formed by blow molding techniques, using the opening in the bottom of the cavity corresponding to the whistle hole to blow air in during the molding process, and to blow the finished part out of the mold. The whistle cap is made by separate injection molding techniques.

1 Claim, 21 Drawing Figures

APPARATUS FOR FORMING A MOLDED SQUEEZE TOY INCLUDING WHISTLE

This is a division of application Ser. No. 727,473, filed Sept. 28, 1976, now abandoned.

BACKGROUND OF THE INVENTION

This relates in general to air-filled squeeze toys of elastomer material which include whistles; and the methods and apparatus for making the same.

Devices of rubber, synthetic rubber or plastic, equipped with whistles which make a noise when the device is squeezed or flexed, have long been used as toys for children and animals. In many prior art types, the whistle is made of one or more metal pieces which are flanged or crimped together to form the resonant chamber; the metal parts being crimped or clamped to the edges of an opening in the toy body. Children and animals have been known to dislodge and swallow such whistle parts with disastrous results. These metal whistle parts often have sharp edges which cause injuries even if not swallowed. In other cases, whistle parts formed of nonmetal may nevertheless be dislodged and swallowed.

Furthermore, when the whistles are made as separate parts, the task of separately applying the whistles to the bodies of the toys is time consuming and expensive.

SUMMARY OF THE INVENTION

Accordingly, the general object of the present invention is to devise improved methods and apparatus for forming whistles in integral relation with toys of elastomer material. A more particular object of the invention is to provide a squeeze toy having an integrally formed whistle which is substantially impossible for children and animals to dislodge and swallow. Another object of the invention is to provide a more efficient, less expensive way of making squeeze toys which include whistles.

These and other objects are realized in accordance with the present invention in an air-filled squeeze toy formed of elastomer material which includes a whistle site comprising a small cavity or depression integrally formed with the body of the toy, which cavity is closed by a disk-shaped or cylindrical cap. The cap and the cavity have axially aligned central openings which serve as air vents.

The body of the toy is preferably blow molded, the whistle cavity being formed by the use of specially designed inserts incorporated into the primary mold, which inserts include a blow hole corresponding to the hole to be formed in the whistle site. During the molding process, the body of the toy is inflated by a blast of air which passes through the blow hole in the insert, and when the molding process is completed, the body is blown out of the mold by a second blast of air passing out through the same blow hole.

The cap is formed separately, preferably by injection molding techniques.

The toys to which the present invention applies may comprise a body formed essentially of any flexible or elastomer material, such as a thermoplastic rubber made by the Shell Chemical Company under the trademark "KRATON". The caps, which may be of a similar material, may assume any one of a number of different forms, such as a flat disk, a rounded button or a small cylinder, which are fitted into and bonded into place in the cylindrical whistle site. The caps are formed separately from the body of the toy, being snapped into and bonded in place in the cavity by a bonding agent which is preferably formed of the elastomer material of the toy body, dissolved in an air-drying solvent.

Particular features of the process of the present invention are that it provides a more efficient and economical way, than available in the prior art, in which to mold the toy body and whistle site in a single operation, wherein the blow hole in the mold functions to form one of the holes in the whistle site. In a preferred embodiment, the caps may be made by separate injection molding techniques.

The final product of this process is a squeeze toy, including a whistle, which can be safely given to children and animals without fear that the whistle will be dislodged and swallowed.

These and other objects, features and advantages will be apparent to those skilled in the art from a study of the attached drawings with reference to the specification hereinafter.

DETAILED DESCRIPTION

The present invention is applicable to any squeeze toy or object of an elastomer material filled with air, formed by any type of well-known molding process in which it is desired to form a whistle integral with the object, which whistles when the toy is squeezed, which will not come loose or readily be dislodged, and which will not be toxic or otherwise harmful to a child or animal using the toy.

Although any suitable rubber, synthetic rubber or elastomer material may be used for the product of the present invention, a material which is particularly adapted for this purpose is a thermoplastic rubber manufactured by the Shell Chemical Company under the trademark "KRATON". This is a thermoplastic block copolymer of styrene and butadiene which combines the resilience and elasticity of vulcanized rubber with thermoplastic processing techniques, achieved without vulcanization. The composition, characteristics and method of making this material are more particularly described in U.S. Pat. No. 3,265,765, issued Aug. 9, 1966 to Geoffrey Holden and Ralph Milkovich, assignors to Shell Oil Company.

It will be understood that any other plastic or synthetic rubber material can be employed for the purposes of the present invention, provided it cures to a body having the desired flexibility. For use in toys, the material must also be nontoxic.

Figure 1:
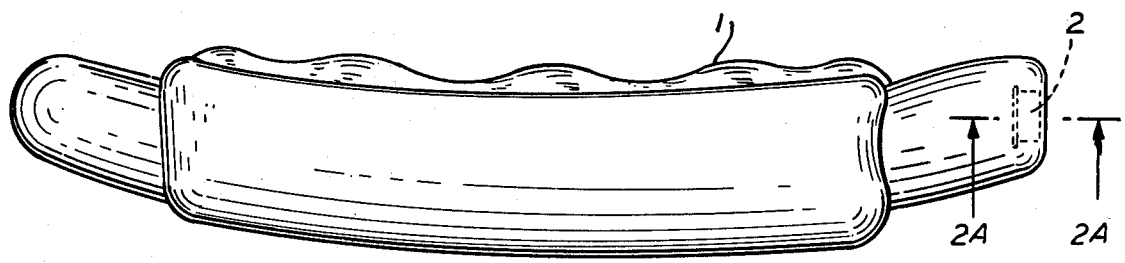
FIG. 1 shows, in side elevation, a typical air-filled elastomer squeeze toy containing a whistle formed in accordance with the present invention.

Referring to FIG. 1, there is shown, in side elevation, an object 1, which is an air-filled sequeeze toy in the form of a hot dog of synthetic rubber or plastic material, such as the thermoplastic material known by the trademark "KRATON", or any similar synthetic rubber or plastic material. Reference character 2 refers to a whistle located at one end, which is indicated in enlarged fragmentary section in FIG. 2A, and in end elevation in FIG. 2B.

Figure 2A:
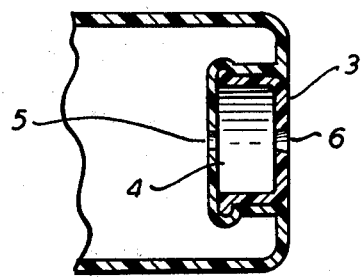
FIG. 2A is an enlarged fragmentary section through the plane 2A—2A of FIG. 1, showing one embodiment of the whistle assembly in accordance with the present invention, in which the closure is provided by a cylindrical cap.
Figure 2B:
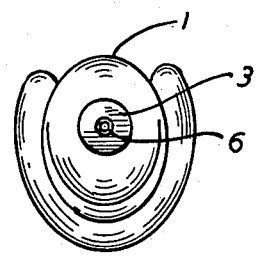
FIG. 2B shows the whistle assembly of FIG. 2A in end elevation.
Figure 3A:
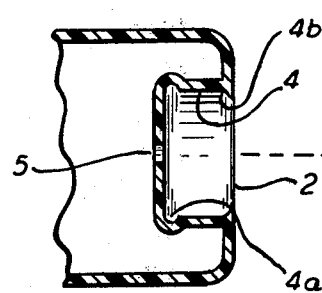
FIGS. 3A and 3B respectively show, in section, the whistle site and the cap of FIG. 2A in spaced apart relation.
Figure 3B:
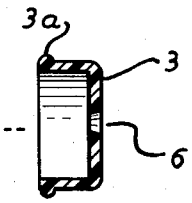

FIG. 3A is a separate showing of the cavity 4 of FIG. 2A, from which the cap, separately shown in FIG. 3B, has been removed. The cavity 4, which is centered in the end of hot dog body 1, is about 0.143 inch deep. Cavity 4 has a wall thickness of 35 mils, is about 0.50 inch in inner diameter, and has a central opening 5, say, 0.110 inch in diameter. The bottom of cavity 4 has a slight recess 4a, forming an annular shoulder about 25 mils wide, and having an inward taper. FIG. 3B shows the cylindrical cap 3, say typically, about 0.500 inch in outer diameter, 0.220 inch in height and having a wall thickness of 27 mils. It has a central opening 6, say, 0.110 inch in diameter, and a slight outwardly directed flange 3a which fits into recess 4a in cavity 4. The opening 6 has an inwardly directed taper.

Although the cap 3 is designed to be snap-fitted into cavity 4, in preferred form it is securely bonded therein. In the present example, the bonding material may comprise a paste made from pellets of a thermoplastic material, such as "KRATON", dissolved in toluol.

Figure 4A:
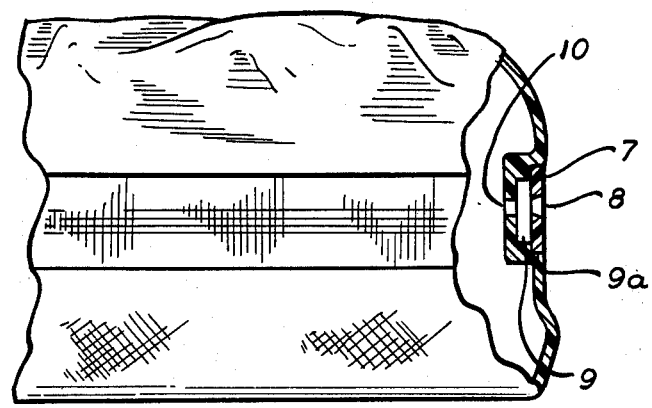
FIG. 4A shows, in section, a modified form of whistle assembly in which a flat disk replaces the cap of FIG. 3A.

FIG. 4A shows, in section and end elevation, an alternative form of the invention comprising a toy of a different shape, but of the same materials as set forth in the previous embodiments, in which a disk 7 (instead of a cap) is seated in a recess 9a of the cavity 9. In this embodiment, the disk may be, say, 40 mils thick and about 0.570 inch in diameter, and may have a central opening 8, 0.110 inch in diameter, which is slightly inwardly tapered. Cavity 9 has an overall depth of, say, 0.183 inch, the annular recess 9a forming an inner flange, say, 40 mils deep from the end surface, having a shoulder 40 mils wide. This provides a space 0.143 inch between the bottom of disk 7 and the bottom of cavity 9, which has a central opening 10.

Figure 4B:
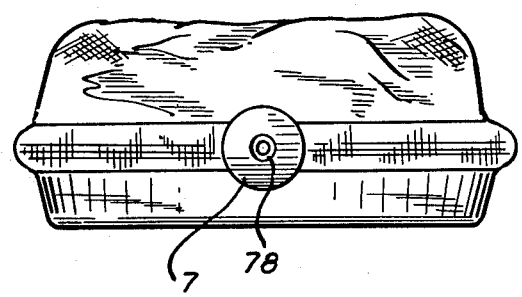
FIG. 4B shows the whistle assembly of FIG. 4A in end elevation.

FIG. 4B is an end elevational view of the toy of FIG. 4A.

Figure 5A:
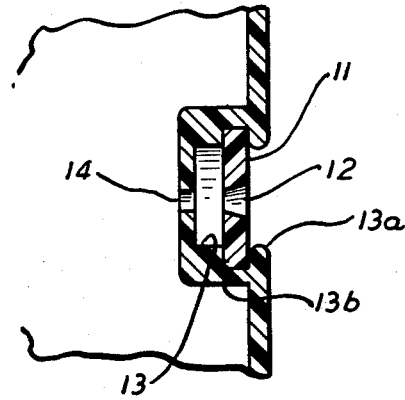
FIGS. 5A and 5B show, in section and end elvation, respectively, a modification of the embodiment of FIGS. 4A, 4B in which the closure disk is slightly recessed.
Figure 5B:
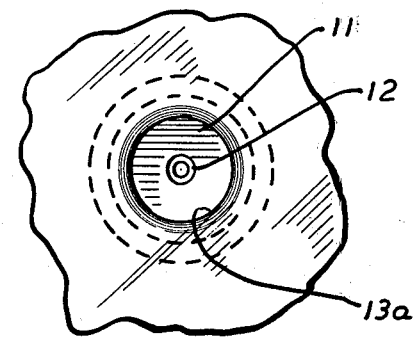

FIGS. 5A and 5B show, in section and end elevation, another alternative in which the cavity 13 is of similar inner diameter to that of FIG. 4A. It has an overall depth of 0.225 inch and has an annular recess 13b, about 0.042 inch below the end surface, which is 0.04 inch wide and 0.04 inch deep. At the end surface, cavity 13 has an annular lip 13a, about 30 mils wide and 42 mils deep, for holding disk 11 in place. This has central openings 12 in the disk, and 14 in the cavity, which are substantially the size of the openings previously described, and are axially aligned.

Figure 6A:
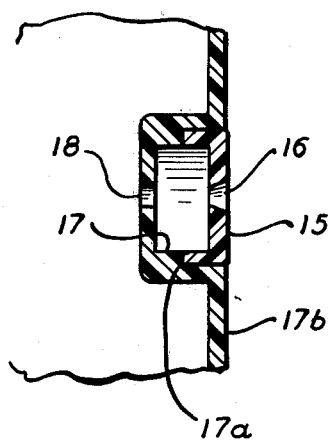
FIGS. 6A and 6B show, in section and end elevation, respectively, another modification of the whistle assembly of the previous figures in which the cylindrical cap is seated on an annular recess in the whistle cavity, so that the cap is flush with the outer surface.
Figure 6B:
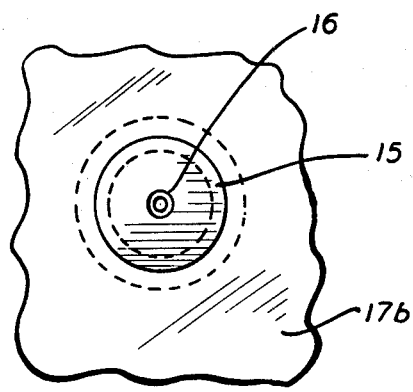

FIGS. 6A and 6B, in section and end elevation, show a further alternative to the whistles previously described, having a cavity 17 which is 0.183 inch deep. This has an annular recess 17a about 0.0915 inch in from the outside end, and about 40 mils wide. This is adapted for accommodating cap 15, with its closed end out and with its face flush with the end surface 17b. The cap has a central opening 16, and the cavity has a central opening 18, both of a similar size to those previously described, and axially aligned.

Figure 7A:
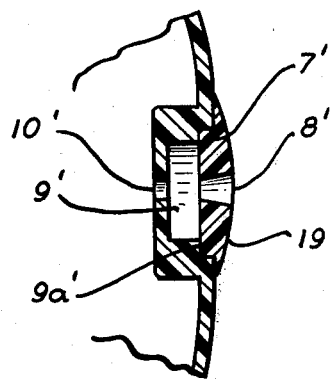
FIGS. 7A, 7B and 7C show, in section, in perspective and in end elevation, respectively, a further modification of the whistle of the present invention in which the outer surface of the closure comprises a rounded button.

FIG. 7A is substantially similar to FIG. 4A (the primed numbers indicating identical elements), except that it includes an external member 19, having an extended peripheral flange, with an overall diameter of 0.645 inch. An average thickness of about 30 mils has been added. The flanged member 19 has a slight outward curvature and conforms to the surrounding surface at its periphery.

Figure 7B:
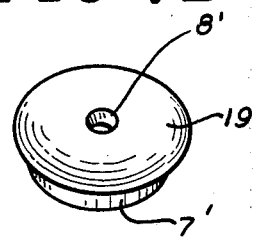
Figure 7C:
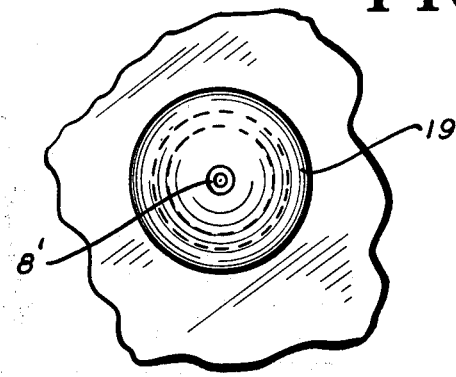

FIG. 7B is an end elevation of FIG. 7A.

It will be appreciated that any of the embodiments previously described can be made to include a rounded flange or button, such as 19. Further, any of the caps described with reference to FIGS. 4A, 5A, 6A and 7A is preferably bonded in place in its corresponding cavity by a bonding agent which may take the form of a thermoplastic, such as "KRATON", dissolved in toluol, or any plastic corresponding to the body of the toy, dissolved in a nontoxic airdrying carrier.

Figure 8A:
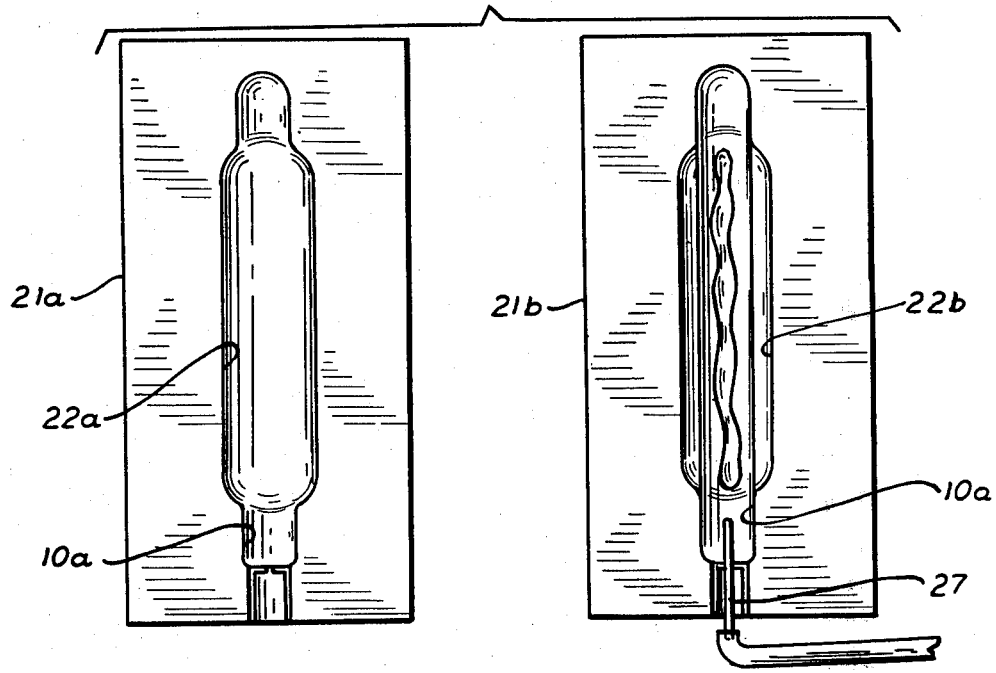
FIG. 8A shows, in plan view, one of the halves of the unmodified blow mold for the toy body in empty and filled condition.

Inasmuch as the preferred method of forming the primary toy body 1, to include the cavity 4 at the desired whistle site, is by blow molding, this method will be described. Referring to FIG. 8A, there is shown one half of the primary molds 21a for the "hot dog", having cavities 22a,22b. The molds 21a,21b are in the form of water-cooled aluminum or beryllium alloy blocks, say, two inches by four inches by 9½ inches, which have been foundry cast in a conventional manner from a rubber pattern, and then machined to the desired pattern, including pinch-offs.

Figure 8B:
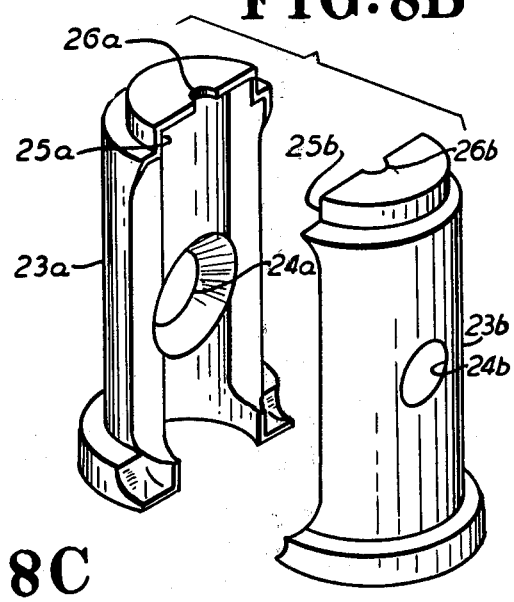
FIG. 8B is an enlarged perspective showing of the two halves of the insert for molding the whistle site cavity integrally with the toy body.

FIG. 8B shows the shape of the insert halves 23a,23b which together are designed to impose a whistle site cavity, such as 4 of FIG. 3A, on the primary toy body. These insert halves are respectively formed with matching cavities 25a and 25b and the semicircular outlines 26a and 26b of the blow hole. Screw holes 24a and 24b permit the insert to be screwed into place in the end of the mold.

Figure 8C:
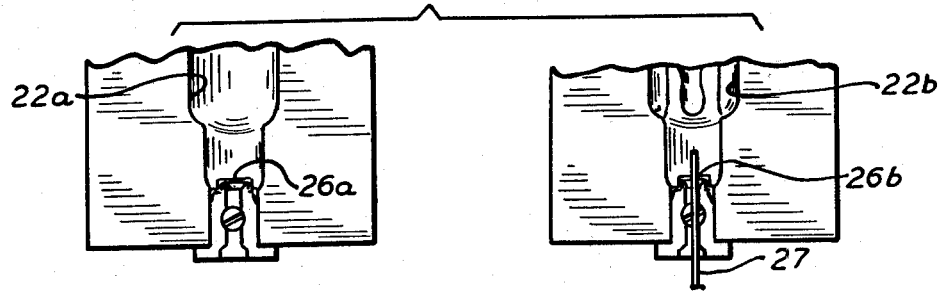
FIG. 8C is a fragmentary showing of the mold half of FIG. 8A, empty and filled, modified to include the insert of FIG. 8B.

FIG. 8C shows, in fragment, one half of the blow mold 22a with the insert half 23a in place at one end of the primary cavity 22a. Insert halves 23a, 23b are machined to specifications from a type of steel which is characterized by minimal shrinkage. The insert halves shown in FIG. 8B are each hollow semicylinders, about 0.684 inch in outer diameter and 1¼ inches along the axis, being shaped internally. Together they form at their upper ends a disk normal to the axis, and a cylindrical cavity 25a25b between ⅛ inch and 1/16 inch deep, and, say, 0.5 inch in diameter, corresponding to cavity 4 in FIGS. 2A et seq. Disk halves 25a,25b together form a central axial opening 26a,26b, which is, say, 0.110 inch in diameter, through which is interposed a blow pin, which is a small steel tube 27 (See FIG. 8C) about four inches long and just large enough in diameter to be accommodated by the hole in the inserts.

The blow molding operation is carried out in any of the machines well-known in the art for this type of operation, which may be of the general form described on page 8, FIG. 1.8 of *Plastics Mold Engineering*, Revised Edition, edited by J. H. DuBois and W. I. Pribble, Reinhold Publishing Corporation, New York, 1966.

Pellets of suitable synthetic rubber of any of the types described above, such as the thermoplastic rubber sold under the trademark "KRATON", are poured into the hopper of the conventional blow molding machine of the type described, and heated to a temperature of between 320° and 325° Fahrenheit. A tube of molten plastic, called a "parison", is extruded vertically down from a tube die. The molten parison is clamped between the pair of die halves 22a and its counterpart 22b. A small tube blow pin 27, about four inches long and just less than ⅛ inch in diameter, is interposed axially through an insert at the lower end of the mold. Compressed air is then forced into the mold through a reciprocating blow pin 27, which is connected through a system of hoses in the blow molding machine. The air passes in at a pressure of between 30 and 70 pounds per square inch, shaping the parison to the die. As the blow pin is retracted, it pulls the product out with it through the lower end of the die. A second blast of air from the blow pin 27 blows the blow molded product off of the blow pin and into a collecting bin.

A particular feature of the method of the present invention is that the hole 26a,26b, formed by the inserts of FIG. 8B, serves a plurality of purposes. It serves as a hole through which the blow pin 27 passes to blow air into the mold 22a,22b in the initial step of shaping the parison. Further, referring again to FIG. 3A, it can be seen that the internal shape of insert combination 25a,25b forms the whistle cavity 4 (See FIG. 2A) in the blow molded product so that the blow hole 5 in the cavity of the product functions as part of the whistle, when the latter is fully assembled.

Once the toy body 1, including whistle site cavity 4, has been formed, it is necessary to form and install the cap 3, as shown in FIG. 3B of the drawings.

In accordance with a preferred embodiment of the invention, the cap 3, and other similar caps, may be injection molded in conventional injection molding equipment of the type described in Chapters 1 and 9 of the book entitled *Plastics Mold Engineering*, Revised Edition, supra. (See, for example, FIG. 1.5 on page 6.) It will be understood that any other conventional type of injection molding equipment can be used for the purposes of the present invention.

Figure 9A:
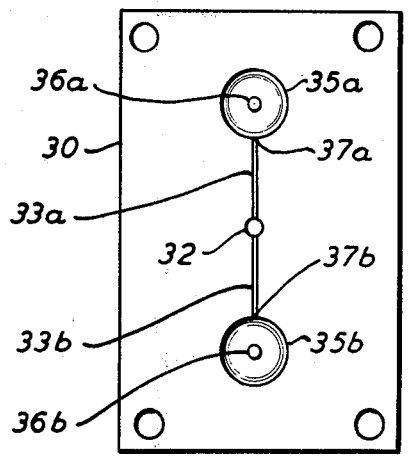
FIGS. 9A and 9B respectively show, in plan view, the two halves of the mold for forming caps by injection molding techniques.
Figure 9B:
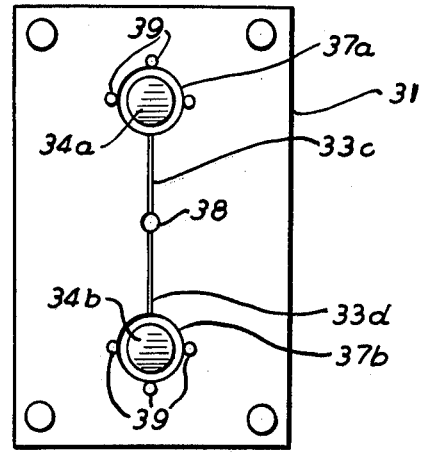

The upper and lower halves of suitable injection molds are shown in plan view in FIGS. 9A and 9B, which show the injection side 30 and the knockout side 31, respectively. Each of these comprises a block of, say, stainless steel which has been cast and then machined to the desired shapes.

The sprue 32 is the central channel along which the molten plastic travels from the source; 38 is the sprue well where the excess collects; 33a,33b and 33c,33d form the runs which connect the sprue to the mold cavities 35a and 35b at opposite ends of the injection side of the mold. The cores 34a and 34b are formed in the knockout side to mate coaxially with cavities 35a, 35b to form the walls of the caps, under control of knockout pins 39. The central pins 36a,36b form the central holes in the caps.

Figure 10A:
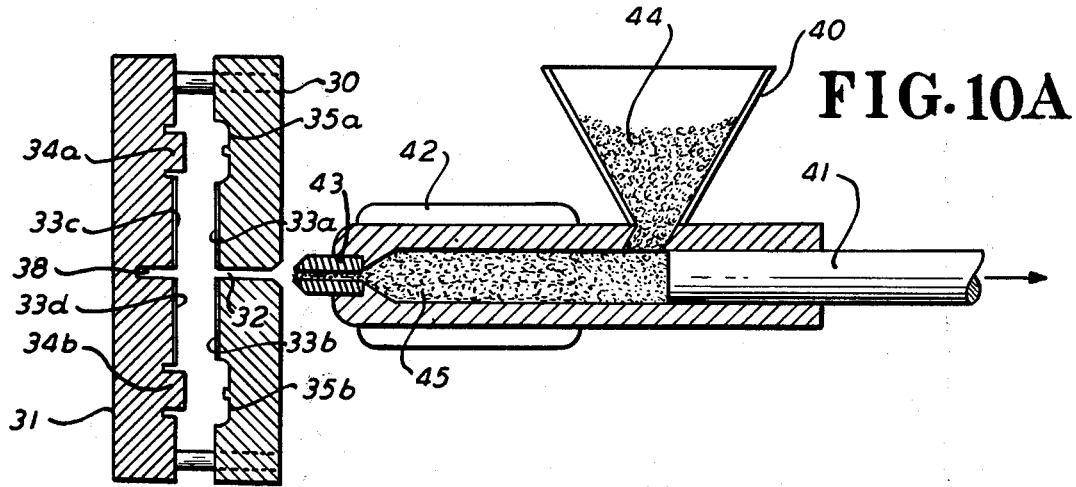
FIGS. 10A and 10B respectively show, in open and closed positions, in schematic longitudinal section, the injection mold and mechanism for forming the caps.
Figure 10B:
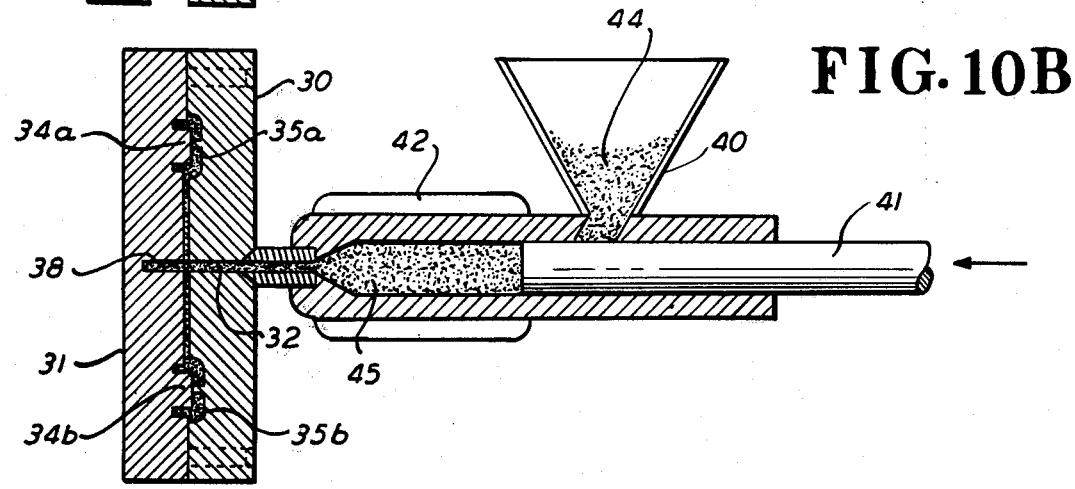

FIG. 10A is a schematic showing in longitudinal section of the two halves of the mold in open position, with a conventional plunger-type injection press being indicated schematically. FIG. 10B shows the injection press operated with the mold in closed position. When the mold is closed, the molten plastic material is forced into the mold by 2 hydraulically driven piston 41, after the supply material comprising pellets of "KRATON" thermoplastic or the like have been placed in hopper 44, and heated up to a molten mass in cavity 45. The molten material then passes through the runs formed by 33a,33c and 33b,33d. Simultaneously, the cores 34a and 34b are forced into the cavities, so that the molten plastic passes from the runs through submarine gates 37a,37b, filling in the space between the core and the inner wall of each of the cavities. Pins 36a and 36b are disposed to close axially against each of the cores 34a,34b to form the central openings in the caps.

It will be understood that caps of any of the types shown in FIGS. 3B, 5B, 6B or 7B, or variations thereof, can be formed by the conventional injection process just described.

Although the invention has been described with reference to specific examples by way of illustatration, it will be understood that the invention is not limited to any of the specific forms or materials shown and described, but only the scope of the appended claims.

What is claimed is:

1. In combination with a molding system for blow-molding an air-filled squeeze body, wherein said system comprises means for producing a parison of thermoplastic material, a pair of primary molds shaped to clutch said parison between them to impose thereon a preselected shape, and means comprising a blow-pin operative in synchronism with the closing of said primary molds for inflating said parison, and upon the opening of said primary molds for blowing the molded squeeze body free from said molds and said blow-pin; the improvement comprising:

means for forming a whistle cavity which is integral with said squeeze body simultaneously with the formation of said squeeze body, said means comprising a pair of insert halves interposed into said primary molds;

each of said insert-halves comprising a semi-annular protuberance substantially closed at one end by a semi-annular closure disposed substantially concentric with the principal axis between said insert-halves for forming said whistle cavity;

said semi-annular closures constructed to form between them in closed position of said primary molds a central blow-hole to accommodate the incursion of said blow-pin into a position coinciding with the center of said whistle cavity, and said blow-pin constructed to form at least one whistle hole in said position upon the freeing of said squeeze body from said blow-pin;
wherein each of said protuberances is semi-cylindrical in form and substantially closed at its inner end by a semi-annular disk, said protuberances being constructed to form between them a cylindrical whistle cavity directed inwardly from the external surface of said body, the blow-hole formed by said insert means being disposed in axial relation to said cylindrical whistle cavity.

* * * * *